March 1, 1966  C. SLATER  3,237,455
ANALYSIS OF PARTICLE SIZE DISTRIBUTION
Filed Feb. 11, 1963
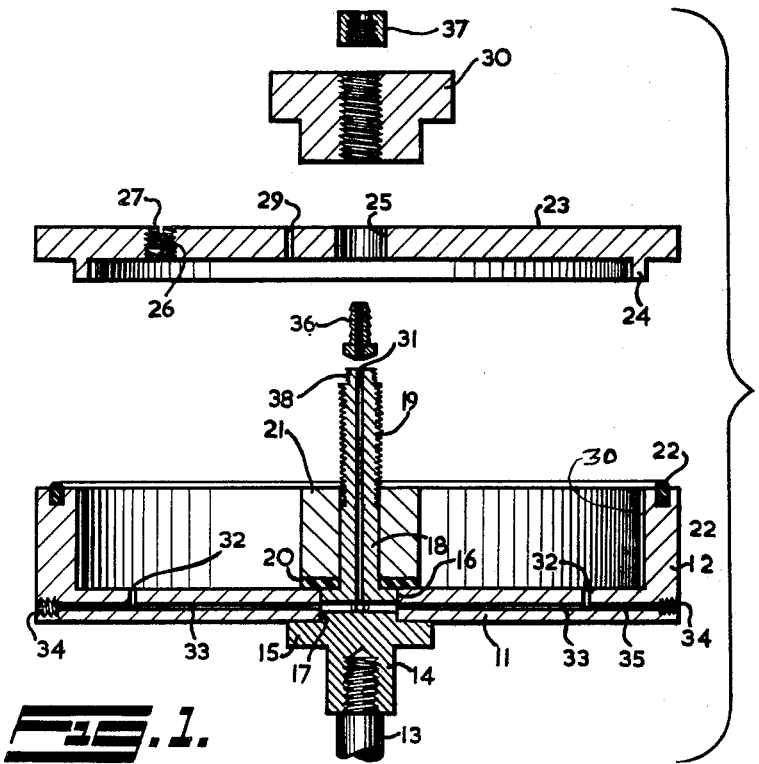
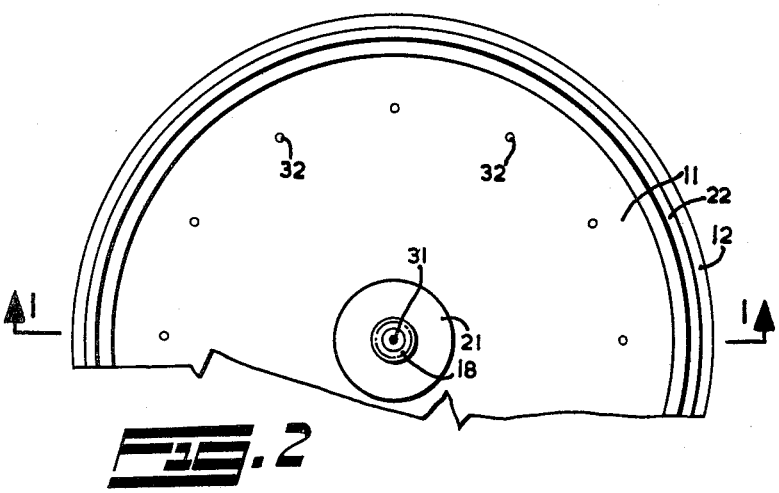
INVENTOR
COLIN SLATER
By: Norris + Bateman, attys 3,237,455
ANALYSIS OF PARTICLE SIZE DISTRIBUTION
Colin Slater, Hazel Grove, Stockport, England, assignor to Simon-Carves Limited, Stockport, England, a British company
Filed Feb. 11, 1963, Ser. No. 257,704
Claims priority, application Great Britain, Feb. 21, 1962, 6,823/62
5 Claims. (Cl. 73—432)

This invention relates to the analysis of particle size distribution and in particular to centrifugal apparatus wherein a change in the distribution of the particles in a liquid suspension may be accelerated and samples withdrawn periodically for subsequent analysis and measurement whilst the change in distribution is continuing and without interfering therewith.

The invention is particularly applicable to the measurement of the particle size distribution of fine powders, principally in the range of 5 to 0.1 microns.

According to the invention, means for determining the particle size distribution in a liquid suspension comprise a cylindrical receptacle having a flat base with driving means extending co-axially therefrom and operable to cause the rotation of said receptacle, a central spigot extending coaxially upwards within said receptacle, a plurality of vertical passages formed downwardly into, but not through said base on the periphery of a circle co-axial therewith, a further vertical passage formed co-axially in said spigot and extending downwardly to the same level as the lower ends of the vertical passages in said base, and a plurality of horizontal passages formed through said base; each horizontal passage connecting at least one of the first-named said vertical passages with said further vertical passage in said spigot and means associated with said further vertical passage adapted to permit the wiithdrawal of suspension through said passages whilst said cylindrical receptacle is being rotated.

But a better understanding of the invention may be obtained from the following description when this is read with reference to the accompanying drawings, of which:

FIGURE 1 is an exploded vertical section on the line 1—1 of FIGURE 2, and

FIGURE 2 is a partial top plan view of a portion of FIGURE 1.

As shown in the drawings, the receptacle comprises a flat, circular, thick base 11 having an integral cylindrical wall 12 extending upwards from the outer periphery thereof. To the base 11, and co-axially thereof, is secured a driving shaft or spindle 13, which may be the rotor spindle of an electrical motor (not shown). Alternatively it may be a short spindle which may either be attached to a chuck on the rotor spindle of a motor or may have a V-belt pulley or chain sprocket attached so that it may be rotated thereby. Any other suitable means may be used to rotate the receptacle.

The vertical wall 12 is comparatively low in comparison with the diameter of the receptacle and the wall 12 and base 11 are also comparatively thick so that when rotating, the inertia mass is sufficient to cause the rotation to be substantially steady and constant.

The spindle 13 is secured coaxially within the base of a boss 14 which has an annular flange 15, the upper surface of which engages beneath the base 11 of the receptacle and which has a cylindrical extension 16 which engages within an aperture 17 in the base 11 with its upper radial surface lying flush with the upper surface of the base. An integral spigot 18 extends coaxially upwards from the extension 16 and has a smooth cylindrical surface up to a level slightly below that of the upper edge of the wall 12 and is then screw-threaded for the remainder of its height as at 19.

When the extension 16 is located in the aperture 17, a flat resilient sealing ring 20 is passed over the spigot 18 and engaged with the base 11 and an annular bush 21 is then passed over the spigot 18 and engaged with the ring 20. In this position, the upper radial end of the bush 21 lies at substantially the same level as the upper edge of the wall 12.

The upper edge of the wall 12 has an annular groove formed downwardly therein and in this groove is located an annular resilient sealing ring 22.

A lid is provided for the receptacle and comprises a disc 23 having a downturned annular flange 24 which pivots with the peripheral surface 30 of the receptacle. When the lid is in position it is adapted to engage the resilient sealing ring 22. The lid is provided with a central aperture 25 which is adapted to pass over the threaded portion 19 of the spigot 18. The lid is also provided with a filling aperture 26 and screw plug 27 and, to provide centrifugal balance, the plug 27 is of equal weight to the material removed in forming the aperture 26. To prevent air locks developing within the receptacle when in operation, and to allow samples to be withdrawn, a small bleed hole 29 is provided in the lid 23 just radially clear of the periphery of the bush 21.

The lid 23 is locked in position by a locking nut 30 which is adapted to be engaged with the screw-threaded portion 19 of the spigot 18, and the receptacle is then rendered susbtantially watertight.

A vertical passage 31 is formed coaxially downwards through the spigot 18 and approximately half way into the upper surface of the extension 16. Further passages 32 of similar lower depth are formed downwardly into the upper surface of the base 11 on a common pitch circle, coaxially of the base 11, on a radius of some three-quarters of the radius of the receptacle. This first-named radius and the diameter of the passages 32 are variable to suit operational requirements.

The passage 31 through the spigot 18 and the further passages 32 into the base 11 are connected by radial passages 33 formed in the base 11 parallel with and substantially medially of its upper and lower surfaces and also in the extension 16, where they all merge into the lower end of the passage 31. The passages are preferably formed diametrically along the base 11 so that each passage 33 connects two diametrically-opposite further passages 32 with the vertical passage 31 in the boss. The radially-outer end of each passage 33 is closed by a plug 34, which may have an extension 35 which closes the outer portion of each passage 33 as far inwards as its junction with a passage 32.

To the upper end of the vertical passage 31 in the spigot 18 is applied to a nipple 36, rotatable relatively to the spigot 18 and secured by a gland nut 37 which screw-threadedly engages a reduced portion 38 at the upper end of the spigot. To the nipple 36 may be applied a conduit or hose from the suction end of an exhausting device (not shown).

The nipple 36 is rotatable so that the exhausting hose may be applied, whilst the receptacle is rotating, to enable samples to be withdrawn without first halting the rotation.

In operation of the device, the receptacle is filled with a liquid suspension of the powder to be analysed; the suspension being of a known concentration. The receptacle is then rotated at a constant speed for the required period, during which period the powder particles will move towards the outside of the receptacle, due to centrifugal forces. The exhausting device is then applied to the nipple 36 and a sample of the suspension on the diameter of the vertical passages 32 in the base 11 is withdrawn through the radial passages 33 and the vertical passage 31 in the spigot 18 whilst the receptacle is still rotating. As soon as the suction is released and the exhausting device is removed the centrifugal forces will drain the passages 33 back into the receptacle, so that there will be no residue of a previous sample left in the passages 33 to give a false sample at the next sampling stage.

The receptacle continues to be rotated, and further samples are drawn off at the appropriate intervals. The concentration of solids in each successive sample is determined by known techniques and is expressed as a fraction of the original concentration.

From these measured fractional concentrations; the timing of, and intervals between, successive samples; the angular velocity of rotation of the receptacle; the inner radius of the receptacle; the radius of the circle upon which the sampling passages 32 are located; the viscosity and density of the suspending liquid and the density of the solid particles, the particle size distribution of the powder can be calculated by the techniques known in the art.

As the present invention is concerned only with the means for providing the necessary samples and as the techniques of analysing these samples do not form a part thereof and are, in any event, well known in the art, it is not considered that such techniques are relevant to a description of the invention per se and they are accordingly not described herein.

What I claim is:

1. Apparatus for sampling a liquid suspension for determining the particle size distribution in said liquid suspension, comprising a receptacle having an internal cylindrical peripheral wall upstanding from a flat bottom surface, drive means for rotating said receptacle about its axis whereby particles in the suspension within the receptacle are centrifugally distributed radially of said receptacle, a spigot extending coaxially upwards within said receptacle, a plurality of circumferentially spaced first vertical passages formed downwardly into said base substantially in a circular row co-axial with said spigot and disposed at a predetermined location intermediate the axis of rotation of said receptacle and said peripheral wall, each of said first vertical passages terminating in an opening in said flat bottom surface of the base for direct access to particles disposed in the annular zone of the suspension overlying the circular row of said openings, a further vertical passage formed coaxially in said spigot, means providing a plurality of horizontal passages connecting all of said vertical passages with said further vertical passage in said spigot, and means connected with said further vertical passage adapted to permit the withdrawal of suspension through said passages at selected times during rotation of said receptacle.

2. Apparatus according to claim 1, wherein said horizontal passages are formed through said base.

3. Apparatus according to claim 2, wherein each horizontal passage is diametrical and connects two of said first vertical passages with said further vertical passage.

4. Apparatus according to claim 1, wherein said receptacle comprises an open-topped cylindrical vessel, a detachable lid for said vessel through which extends said spigot, and sealing means for said lid.

5. Apparatus according to claim 1, wherein said circular row lies at substantially three-quarters of the radial distance between said spigot and said peripheral wall.

References Cited by the Examiner

UNITED STATES PATENTS 2,956,434   10/1960   Donoghue _____ 73—432

FOREIGN PATENTS 881,665   11/1961   Great Britain.

LOUIS R. PRINCE, *Primary Examiner.*

JOSEPH P. STRIZAK, RICHARD C. QUEISSER,
*Examiners.*